(12) United States Patent
Taga (10) Patent No.: US 10,597,908 B2
(45) Date of Patent: Mar. 24, 2020

(54) VEHICLE DOOR LATCH DEVICE

(71) Applicant: MITSUI KINZOKU ACT CORPORATION, Yokohama-shi, Kanagawa (JP)

(72) Inventor: Takao Taga, Yokohama (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 328 days.

(21) Appl. No.: 15/328,548

(22) PCT Filed: Apr. 7, 2015

(86) PCT No.: PCT/JP2015/060894
§ 371 (c)(1),
(2) Date: Jan. 24, 2017

(87) PCT Pub. No.: WO2016/038920
PCT Pub. Date: Mar. 17, 2016

(65) Prior Publication Data
US 2017/0211299 A1    Jul. 27, 2017

(30) Foreign Application Priority Data

Sep. 8, 2014    (JP) ................. 2014-182440

(51) Int. Cl.
*E05B 77/44*    (2014.01)
*E05B 79/22*    (2014.01)
(Continued)

(52) U.S. Cl.
CPC .............. *E05B 77/44* (2013.01); *E05B 79/20* (2013.01); *E05B 79/22* (2013.01); *E05B 85/02* (2013.01); *B60J 5/04* (2013.01)

(58) Field of Classification Search
CPC .......... E05B 77/44; E05B 79/20; E05B 79/22; E05B 85/02; B60J 5/04
(Continued)

(56) References Cited

U.S. PATENT DOCUMENTS 6,240,754 B1 *   6/2001   Petersen ................. E05B 83/36
                                              292/346
6,546,767 B1 *   4/2003   Kirejczyk ............... E05B 83/36
                                              292/346

(Continued)

FOREIGN PATENT DOCUMENTS

JP          4765123 B2      9/2010
JP         2011132771 A     7/2011
JP         2013-238090 A    11/2013

OTHER PUBLICATIONS

Japanese Office Action issued in corresponding Japanese Patent Application No. 2015-095947 dated Oct. 30, 2018.
(Continued)

*Primary Examiner* — Carlos Lugo
*Assistant Examiner* — Thomas L Neubauer
(74) *Attorney, Agent, or Firm* — Davis & Bujold PLLC; Michael J. Bujold (57) ABSTRACT

A vehicle door latch device which prevents a theft component from getting into an operation-mechanism holding portion thereby improving an anti-theft performance of the vehicle door latch device, by a smaller and lighter arrangement. On a synthetic-resin body, a protection wall is provided that prevents a theft component, inserted in the door, from getting into the casing by covering a connecting part of an outside lever and an operation mechanism, held in the casing, from a vehicle-outside direction.

4 Claims, 10 Drawing Sheets

(51) Int. Cl.
*E05B 85/02* (2014.01)
*E05B 79/20* (2014.01)
*B60J 5/04* (2006.01)

(58) Field of Classification Search
USPC ............ 292/216, DIG. 23, 201, 337; 70/264
See application file for complete search history.

(56) References Cited

U.S. PATENT DOCUMENTS 8,613,160 B2   12/2013  Matsumoto et al.
8,662,545 B2 *   3/2014  Taga ....................... E05B 85/02
                                                              292/201
9,580,941 B2 *   2/2017  Heberer ................. E05B 77/04

OTHER PUBLICATIONS

International Search Report Corresponding to PCT/JP2015/060894 dated Jun. 9, 2015.
Written Opinion Corresponding to PCT/JP2015/060894 dated Jun. 9, 2015.

\* cited by examiner

VEHICLE DOOR LATCH DEVICE

This application is a National Stage completion of PCT/JP2015/060894 filed Apr. 7, 2015, which claims priority from Japanese patent application serial no. 2014-182440 filed Sep. 8, 2014.

BACKGROUND OF THE INVENTION

The present invention relates to a vehicle door latch device.

A conventional vehicle door latch device comprises an engagement unit that includes an engagement mechanism that comprises a latch that can engage with a striker of a vehicle body and a ratchet or a pawl that can engage with the latch in a synthetic-resin body fixed in a door in a first casing, and an operation unit that can switch to an unlock state in which the engagement unit can be released and to a lock state in which the engagement unit cannot be released in JP4765123B.

The door latch device in which an outside lever that rotates with an opening action of an outside handle on a door is pivotally mounted via a pivot shaft under a connection with the engagement unit of the first casing, and an outer end of the outside lever is connected to an outside handle and an inner end is connected to an operation mechanism.

In the door latch device in JP4765123B, a pivot portion of the outside lever to the first casing is exposed and an opening through which a part of the first casing under an engagement unit of the first casing communicates with an operation-unit holding part of the second casing, which causes a problem in antitheft performance.

For example, through a gap between an outer panel of the door and a door glass, theft means such as a special tool is inserted and got into a holding part for the operation mechanism through the opening. A locking means for the operation mechanism is unlocked by the theft means in an unlocking direction, and the door can be opened.

In order to prevent it and not to insert the theft means into the operation-mechanism holding portion, it is necessary to close the opening by providing a protection wall. If the protection wall is provided in the metal back member, the back member gets greater to increase its mass, so that it is not possible to make the door latch device smaller and lighter.

In order to improve antitheft performance, the outside lever is held in the first casing with exposure of a connecting portion with the outside handle only and it is considered that a connecting portion of the outside lever with the operation mechanism is covered with the first casing. In view of connection of the outside lever in the first casing, it is necessary that a pivot shaft for the outside lever is fixed to the back member by caulking.

In order to carry out caulking, a part around the pivot shaft of the first casing is opened and a caulking tool is inserted. An antitheft problem is likely to occur as well as the above also when the opening is formed in the first casing.

In the door latch device in Patent Literature 1, in order to position and connect the engagement unit to the first casing, positioning means is provided in the engagement unit and the first casing. Because the positioning means comprises an engagement portion or a projection in a metal back member behind the body and an engagement groove in which the engagement portion can engage, the engagement projection is formed in addition to the protection wall in the metal back member, so that the back member gets larger and heavier.

SUMMARY OF THE INVENTION

In view of the disadvantages, it is an object of the present invention to provide a vehicle door latch device that improves antitheft performance by preventing theft means from getting into an operation-mechanism holding portion and a protection wall is provided in parts except a back member so that the device may get smaller and lighter.

DETAILED DESCRIPTION OF PREFERRED EMBODIMENT

An embodiment of the present invention will be described with the drawings.

In FIGS. 1 to 4, a door latch device 1 according to the present invention is fixed to the rear end of an inner panel D1 of a right-side front door (hereinafter to "door") of a vehicle and comprises an engagement unit 2 for holding the door D closed and an operation unit 3 for operating the engagement unit 2. The engagement unit 2 is integrally connected to the operation unit 3.

Figure 1:
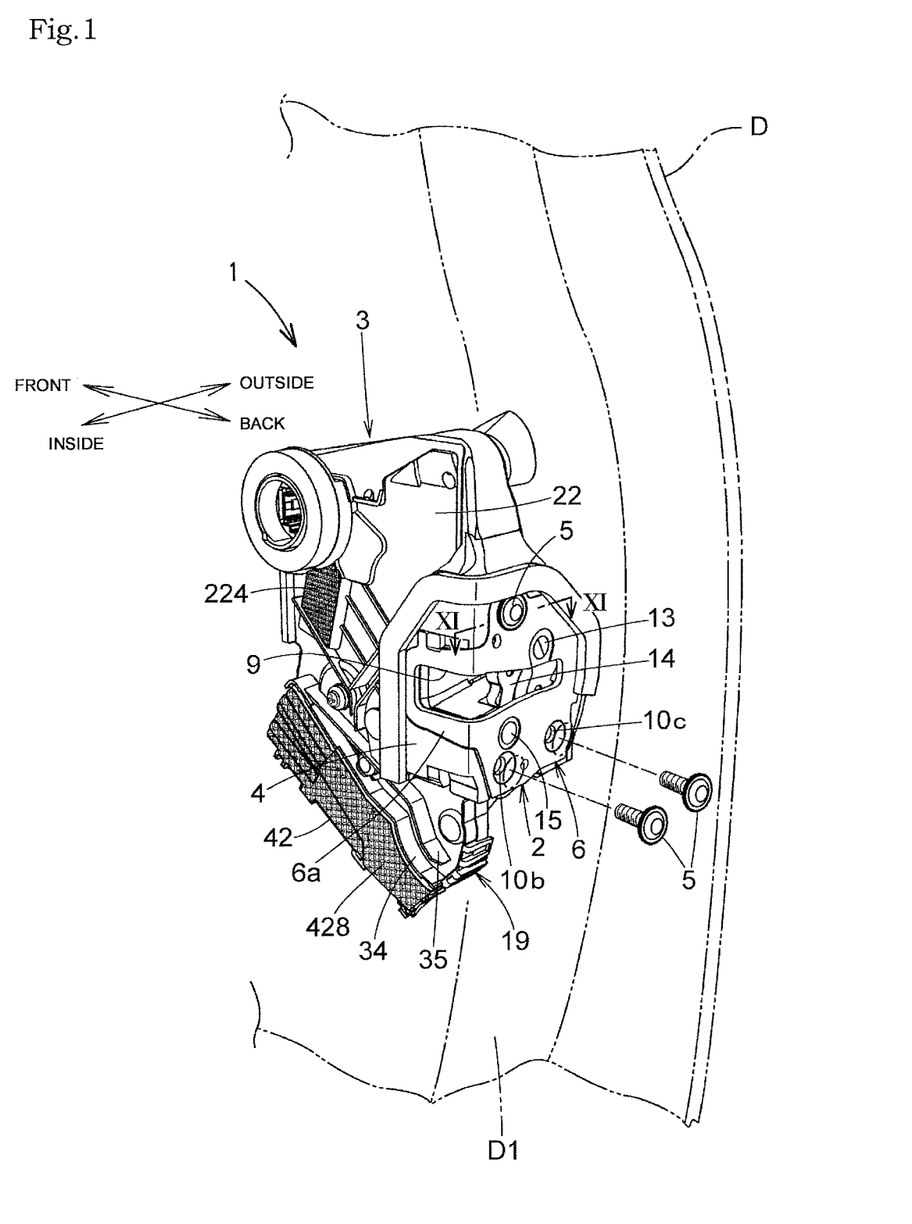
FIG. 1 is a perspective view of a door latch device according to the present invention and a door in which the door latch device is attached in a vehicle.
Figure 2:
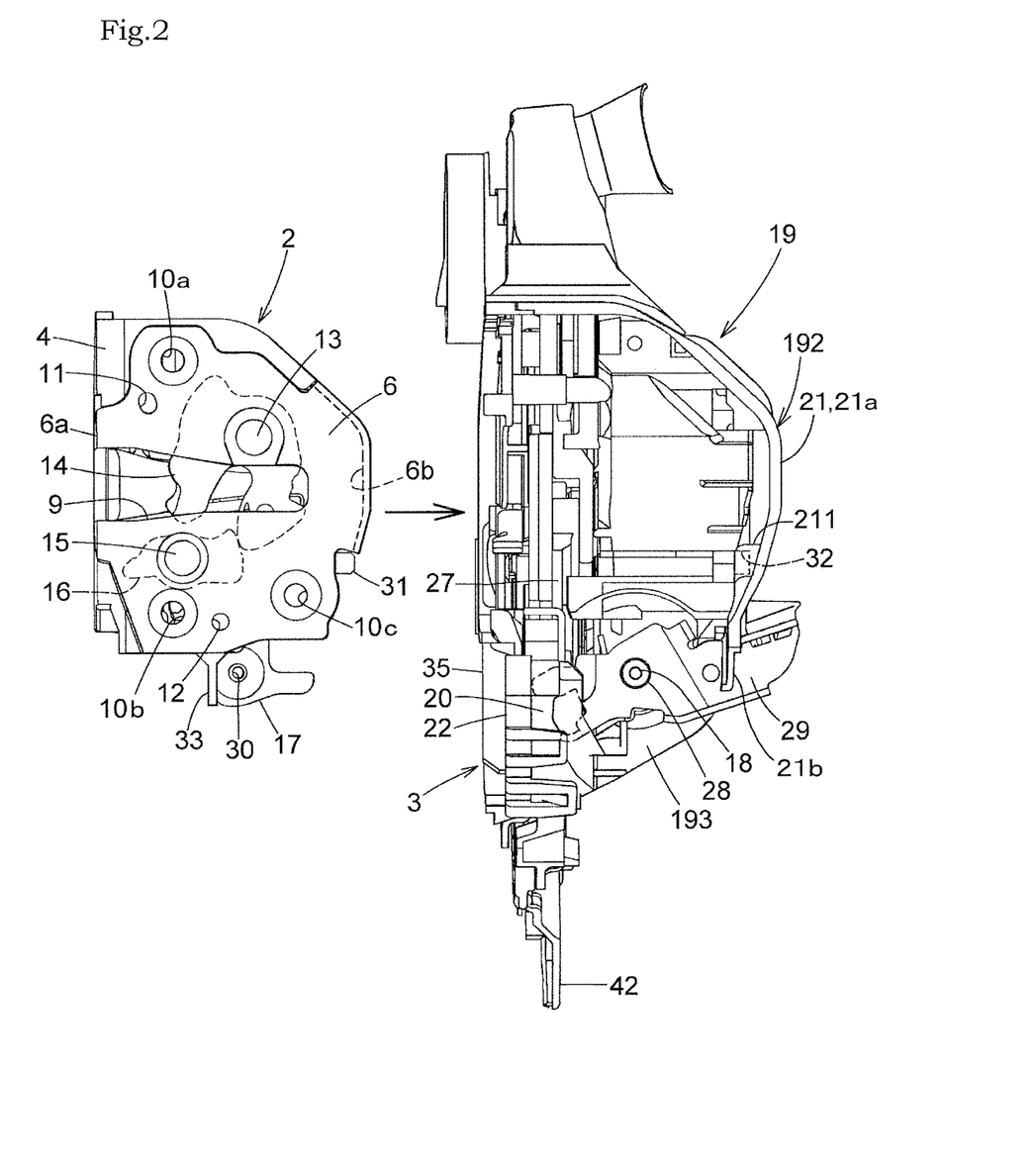
FIG. 2 is a back view of the door latch device before an engagement unit is connected to an operation unit.
Figure 4:
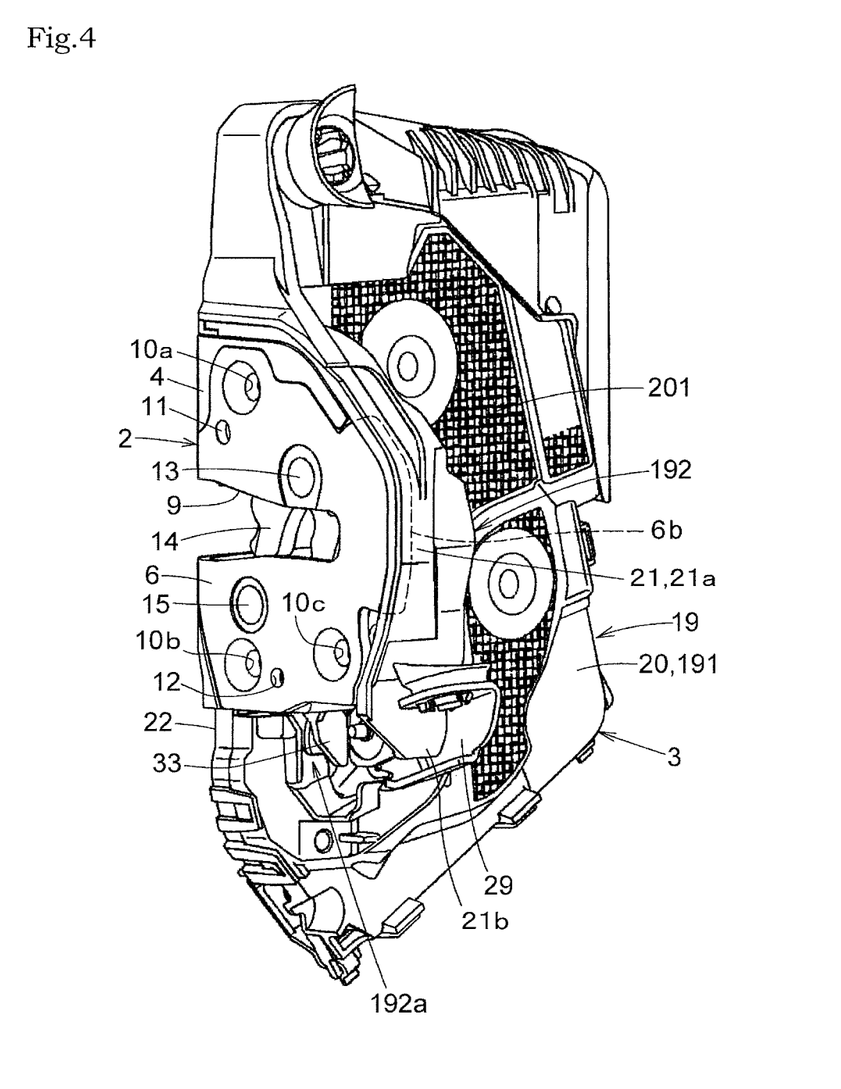
FIG. 4 is a perspective view of the door latch device seen obliquely from a back.
Figure 8:
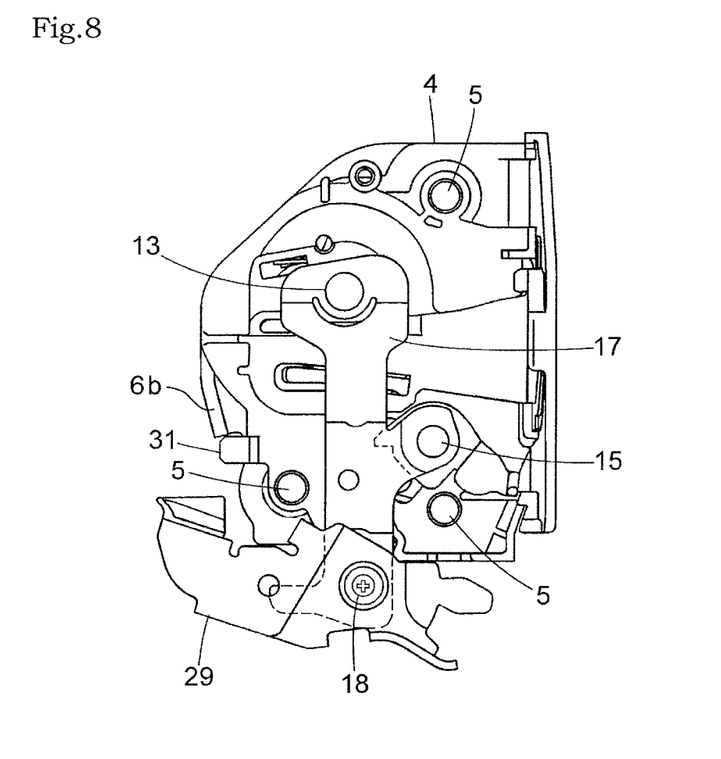
FIG. 8 is a front elevational view of the engagement unit.

The engagement unit 2 comprises a box-like synthetic-resin body 4 and a metal cover member 6 fixed with the body 4 to a rear part of the inner panel D1 within the door D. An engagement mechanism 8 for holding the door closed is housed in a space between the body 4 and the cover member 6. In FIG. 1, there is formed an inward bent portion 6a which is bent at right angles forward or toward the body 4 in the middle of a side edge of the cover member 6 and which is in contact with the inner side of the body 4. In FIGS. 2, 4 and 8, there is formed an outer short bent portion 6b which is bent at approximately right angles forward or toward the body 4 in the middle of a side edge opposite a striker-entering groove 9 of the cover member 6. The cover member 6 may have only the outer bent portion 6b without the inner bent portion 6a. In the body 4 and the cover member 6, a striker-entering groove 9 into which the striker 7 gets on closing the door D is formed.

Over the striker-entering groove 9 of the cover member 6, a female screw hole 10a is formed by burring, and under it, two female screw holes 10b, 10c are formed by burring. The female screw holes 10a, 10b are spaced from a rotating path of the latch 14 and the ratchet 16 of the engagement mechanism 8 so that bolts 5 that engage in the female screw holes 10a, 10b do not come in contact with the latch 14 and the ratchet 16. The upper female screw hole 10a is positioned close to the inner side opposite the outward bent portion 6b of the cover member 6, and two lower female screw holes 10b, 10c are spaced along an entering direction of the striker 7 close to inner and outer edges. The bolts 5 engage in the female screw holes 10a, 10b, 10c, so that the engagement unit 2 is fixed to the inner panel D1 in FIG. 1.

Figure 3:
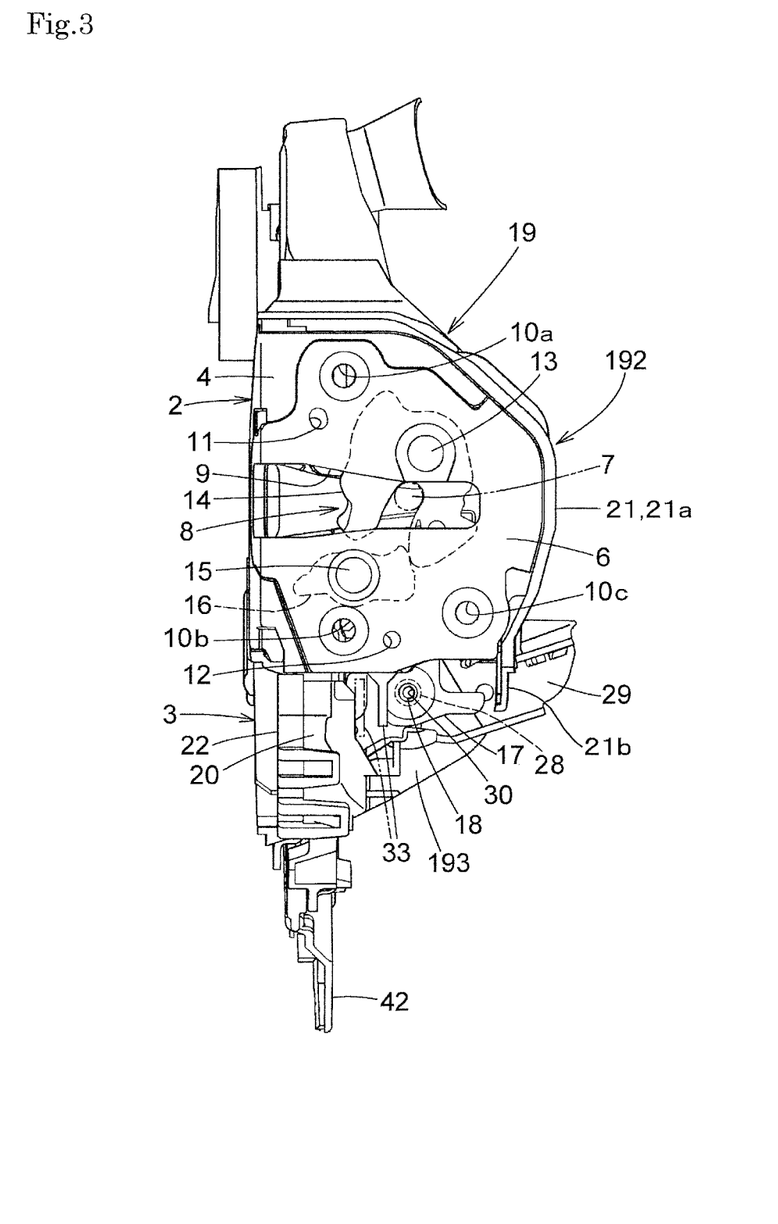
FIG. 3 is a back view after the engagement unit is connected to the operation unit.

In FIGS. 2 and 3, over and under the striker-entering groove 9 of the cover member 6, there are formed an elongate positioning hole 11 and a circular positioning hole 12. The upper positioning hole 11 is formed obliquely below the upper female screw hole 10a close to the inward edge of the cover member 6, and the lower positioning hole 12 is formed between the two lower female screw holes 10b and 10c close to the female screw hole 10b. A longer diameter of the upper elongate hole 11 is along a straight line that connects a center of the positioning hole 11 to a center of the positioning hole 12, and a shorter diameter is equal to a diameter of the lower positioning hole 12 so that equal positioning projection may put into the upper and lower positioning holes 11, 12. The positioning holes 11, 12 are formed as small as possible to keep the cover member 6 enough in strength. The upper positioning hole 11 may be formed close to the upper female screw hole 10a and the outside of the vehicle, or in the middle. Contrary to this embodiment, the upper positioning hole 11 may be circular and the lower positioning hole 12 may be elongate.

The upper and lower positioning holes 11, 12 are used for positioning and fixing the cover member 6 with positioning jigs when the engagement unit 2 is automatically assembled along an automatic assembling line. The engagement unit 2 is generally positioned with three bolt-inserting holes. When the female screw holes 10a, 10b, 10c are formed as the three bolt-inserting holes as above, projections of the positioning jigs fit in the female screw holes 10a, 10b, 10c, an internal thread of the female screw holes 10a, 10b, 10c is likely to be broken. Thus, the positioning holes 11, 12 are additionally formed. Why the upper positioning hole 11 is circular is that the projection of the positioning jig can easily get in and out. Why the longer diameter of the positioning hole 11 is along a straight line that connects the center of the positioning hole 11 to the center of the positioning hole 12 is that the cover member 6 is prevented from rotating and deviating around the lower positioning hole 12 when the positioning projections with the same external diameter get in the upper and lower positioning holes 11, 12.

The upper positioning hole 11 is formed close to the side toward the inside of the vehicle, and the lower positioning hole 12 is formed between the two lower female screw holes 10b and 10c. The positioning holes 11, 12 are widely spaced from an outer bent portion 6b. When the outer bent portion 6b is bent by stamping after the positioning holes 11, 12 are formed, the projection of the positioning jig is unlikely to be incapable of inserting with deformation. The striker-entering groove 9 is formed in the inner bent portion 6a which provides lower bending rigidity than the outer bent portion 6b. Thus, even if the upper positioning hole 11 is formed close to the inner bent portion 6a, the positioning hole 11 will not be deformed.

The engagement mechanism 8 is pivotally mounted via a pivot shaft 13 in the body 4 and is biased by a spring (not shown) in an opening direction or clockwise in FIG. 2. The engagement mechanism 8 comprises a latch 14 that can engage with a striker 7 of a vehicle body; and a ratchet 16 that is pivotally mounted in the body 4 via a pivot shaft 15 and can engage with an outer circumference of the latch 14. When the door D is closed, the striker 7 engages with the latch 14 and the ratchet 16 engages with the outer circumference of the latch 14 thereby preventing the latch 14 from turning in the opening direction, so that the door D is held closed.

When a locking lever 24 (later described) of the operation unit 3 is in an unlock position, an outside lever 29 or an inside lever 26 is rotated with an opening action of an outside handle (not shown) on the door D outside the vehicle or an inside handle (not shown) on the door D inside the vehicle, and the ratchet 16 that engages with the outer circumference of the latch 14 is released and turned by an opening lever 27 (later described) connected to the outside lever 24, so that the door D can be opened.

In FIG. 8, the front ends of the pivot shafts 13, 15 pass through the body 4 and is fixed by caulking to a vertical metal back member 17 fixed to a front face (back face) thereof. Thus, the body 4 is firmly held by the cover member 6 and the back member 17. The lower end of the back member 17 projecting downward from the lower end of the body 4 is fixed to a lower part of a second casing 192 of a casing 19 (later described) with a bolt 18 inserted from the front face of the second casing 192.

Figure 9:
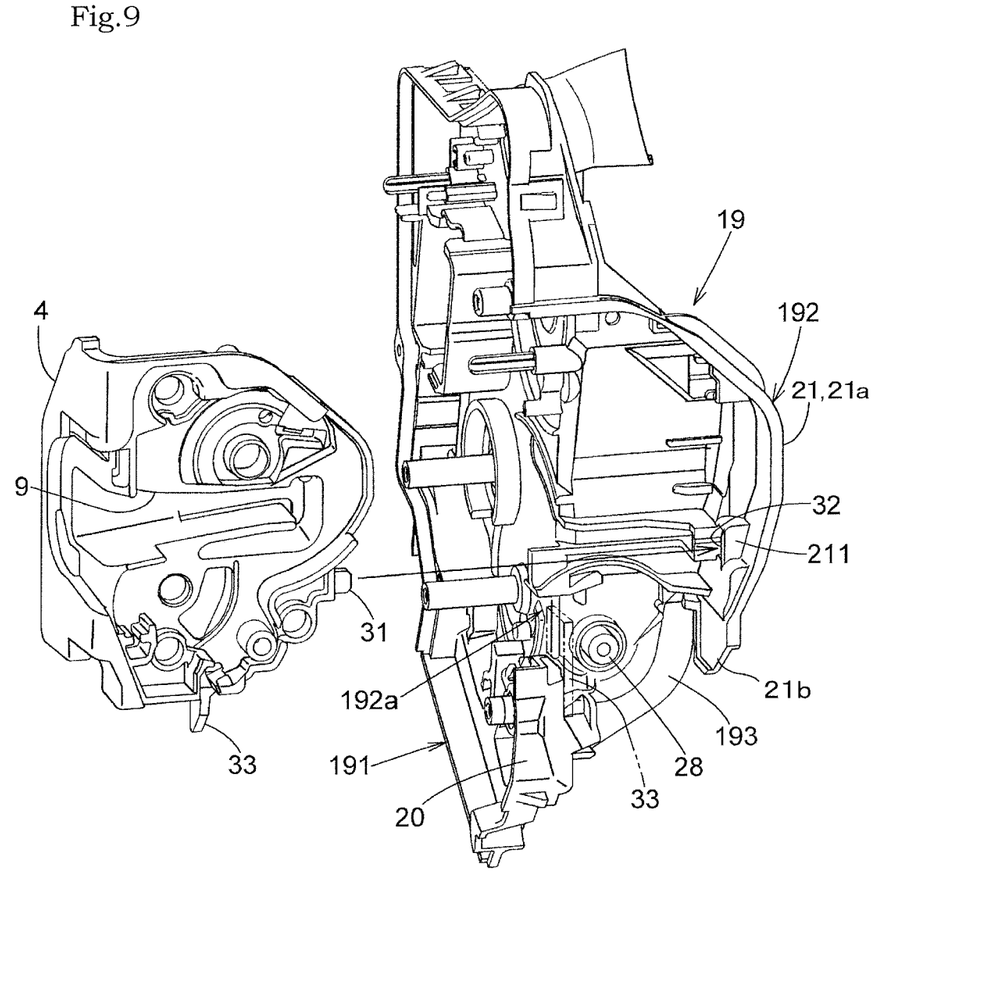
FIG. 9 is a perspective view seen of a casing and a body seen from a back.

The operation unit 3 comprises an L-shaped synthetic-resin casing 19 in FIG. 9. The casing 19 comprises a first casing 191 made of synthetic resin and comprising an operation-mechanism holding portion 20 disposed close to the inner side of the inner panel D1 of the door D to open toward the inside of the vehicle; a second casing 192 made of synthetic resin and comprising a body-holding portion 21 extending from the rear end of the middle of the first casing 191 toward the outside of the vehicle at approximately right angles and being open along its rear surface; and a synthetic-resin cover 22 that closes an opening of the operation-mechanism holding portion 20 of the first casing 191 except around the striker-entering groove 9 of the body 4 of the engagement unit 2. The casing 19 and the cover 22 are molded from, for example, polyacetal resin (POM). In FIG. 4, on the side of the operation-mechanism holding portion 20 of the first casing 191, there is formed a mesh-like ridge 201 for preventing sliding when the door latch device 1 is held and connected to the door D. In FIG. 1, there is formed a mesh-like ridge 224 for preventing slipping when the door latch device 1 is held and connected to the door D. In FIG. 1, there is formed a mesh-like ridge 224 for preventing slipping on the upper side of the cover 22.

In a space between the operation-mechanism holding portion 20 of the first casing 191 and the cover 22, there is provided an operation mechanism for switching the engagement mechanism 8 to an unlock state where it can be released from the striker and a lock state where it cannot be released by operating the engagement mechanism 8 of the engagement unit 2. The operation mechanism comprises an actuator (not shown) with a motor for carrying out locking/unlocking automatically; a key lever (not shown) moving with a key cylinder (not shown); a locking lever 24 connected to a locking knob (not shown) on the door inside the vehicle via a first Bowden cable 23 (FIG. 6) as a motion transmitting member and moved to a lock position and an unlock position by the locking knob or the actuator, as part of the locking means; an inside lever 26 connected to the inside handle (not shown) on the door D inside the vehicle via a second Bowden cable 25 (in FIG. 6) as a motion transmitting member, the inside lever 26 turning with an opening action of the inside handle; and an opening lever 27 (in FIG. 2) connected to the end of the outside lever 29 that moves with an opening action of the outside handle (not shown) on the door outside the vehicle and connected to the key lever and the locking lever 24 to move the opening lever 27 to a lock position and an unlock position. The structural parts of the operation mechanism do not directly relate to the present invention, and is a known one that is assembled into a conventional door latch device. Its detailed description is not mentioned.

In FIG. 3, when the engagement unit 2 is connected in the body holding portion 21, the lower end of a base portion 193 of the second casing 192 projects from the engagement unit 2 downward. In FIG. 9, a support shaft 28 projects backward along length of the vehicle on a rear surface of the base portion 193. The outside lever 29 is pivotally mounted vertically in the middle via the support shaft 28 so that the end toward outside of the vehicle projects from the second casing 192. A mounting portion of the second casing 192 for the outside lever 29 or a surface opposite the inner panel D1 of the door D is open and exposed except the inner end of the outside lever 29.

In FIGS. 2 and 3, at the lower end of an outer circumferential wall 21*a* of the body holding portion 21 of the second casing 192, there is formed a swinging-preventing portion 21*b* close to an outer rear surface of the outside lever 29. The outer end of the outside lever 29 is held by the swinging-preventing portion 21*b* and the base portion 193 of the second casing 192 thereby preventing the outside lever 29 from loosening along the length of the vehicle. The swinging-preventing portion 21*b* also acts as a protection wall for preventing theft means inserted in the door from getting into the operation-mechanism holding portion 20.

When the engagement unit 2 is connected to the body-holding portion 21, a rear surface of the support shaft 28 and a rear surface of a middle of the outside lever 29 are covered with a lower part of the back member 17 which projects downward from the engagement unit 2. At the lower end of the back member 17 opposite the support shaft 28, there is formed a female screw hole 30 in which the bolt 18 inserted from a front surface of the second casing 192 passes through the support shaft 28, thereby holding the middle of the outside lever 29 rotatably between the second casing 192 and the back member 17. An inner end of the outside lever 29 is connected to an opening lever 27 of an operation mechanism housed in the operation-mechanism holding portion 20, through an opening 192*a* (in FIGS. 4 and 9) through which the operation-mechanism holding portion 20 of the first casing 19 communicates with the second casing 192, below the engagement unit 2 of the casing 19.

In FIGS. 2, 8 and 9, there is formed a plate-like engagement portion 31 at the outer side of the body 4. In a thick portion 211 of an outer side wall of the body holding portion 21 of the second casing 192, there is formed an engagement groove 32 that is open toward the inner panel D1 of the door D or inward of the vehicle. The engagement groove 32 can engage with an engagement portion 31 when the engagement unit 2 is connected to the operation unit 3. The engagement portion 31 and the engagement groove 32 constitute positioning means for positioning and fixing the engagement unit 2 to the body holding portion 21 of the second casing 192.

In FIGS. 2-4 and 9, in the middle of a lower surface of the body 4, a protection wall 33 close to a rear surface of the outside lever 29 is provided close to the opening 192*a* which communicates with the engagement-mechanism holding portion 20. The opening 192*a* is covered with the protection wall 33. Even if the theft means such as a special tool is inserted toward a mounted portion of the outside lever 29 of the casing 19 through a gap between an outer panel of the door and a door glass, it will be blocked by the protection wall 33. Thus, the theft means does not get into the operation-mechanism holding portion 20 through the opening 192*a*. Thus, locking means such as the opening lever 27 within the operation-mechanism holding portion 20 cannot be moved by the theft means in an unlocking direction and the door is not likely opened.

The protection wall 33 is integrally formed with the synthetic body 4. Thus, the back member 17 can be made smaller and lighter than a metal back member together with a protection wall, thereby providing a smaller and lighter door latch device. Furthermore, as mentioned above, the engagement portion 31 as the positioning means is integrally formed with the synthetic resin body 4, not the metal back member 17, thereby making the door latch device lighter.

Figure 5:
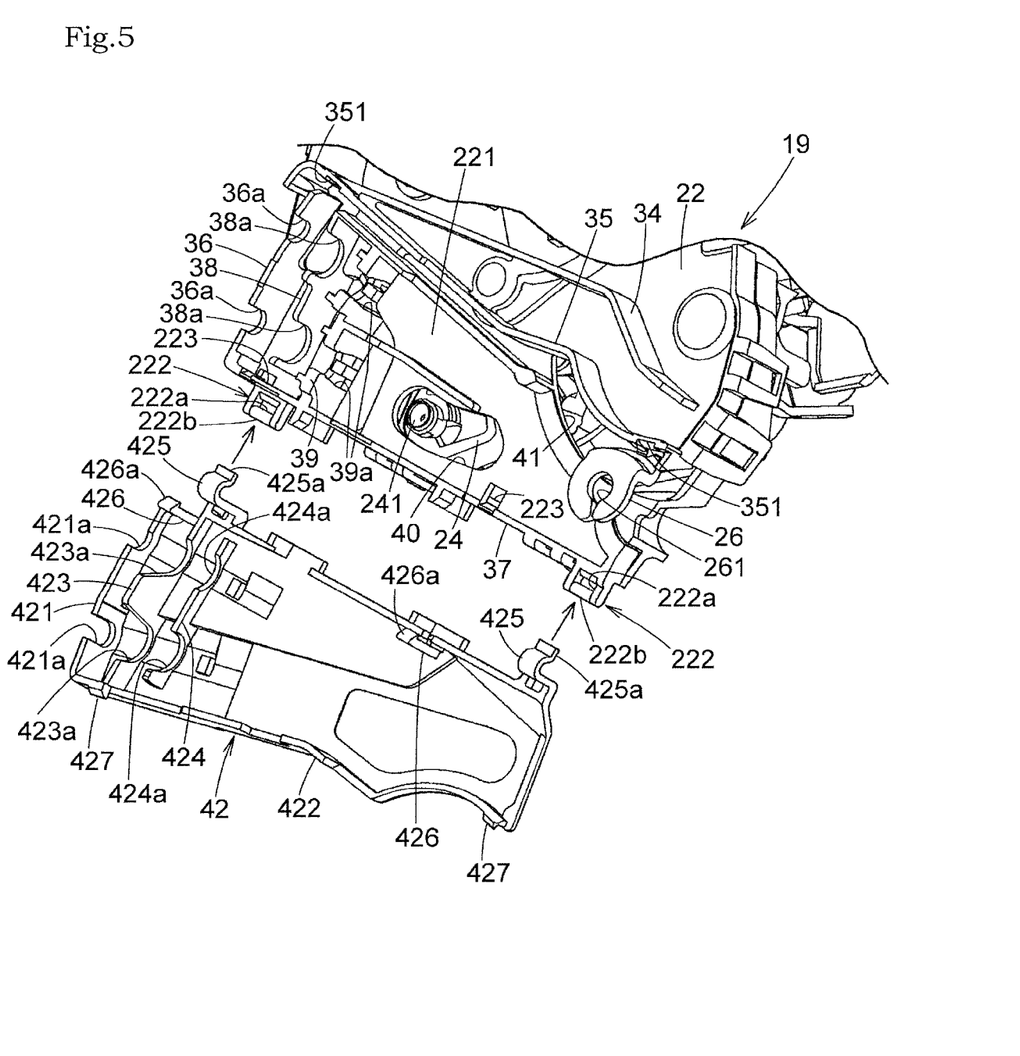
FIG. 5 is a perspective view of an auxiliary cover and the door latch device before the auxiliary cover is attached.
Figure 6:
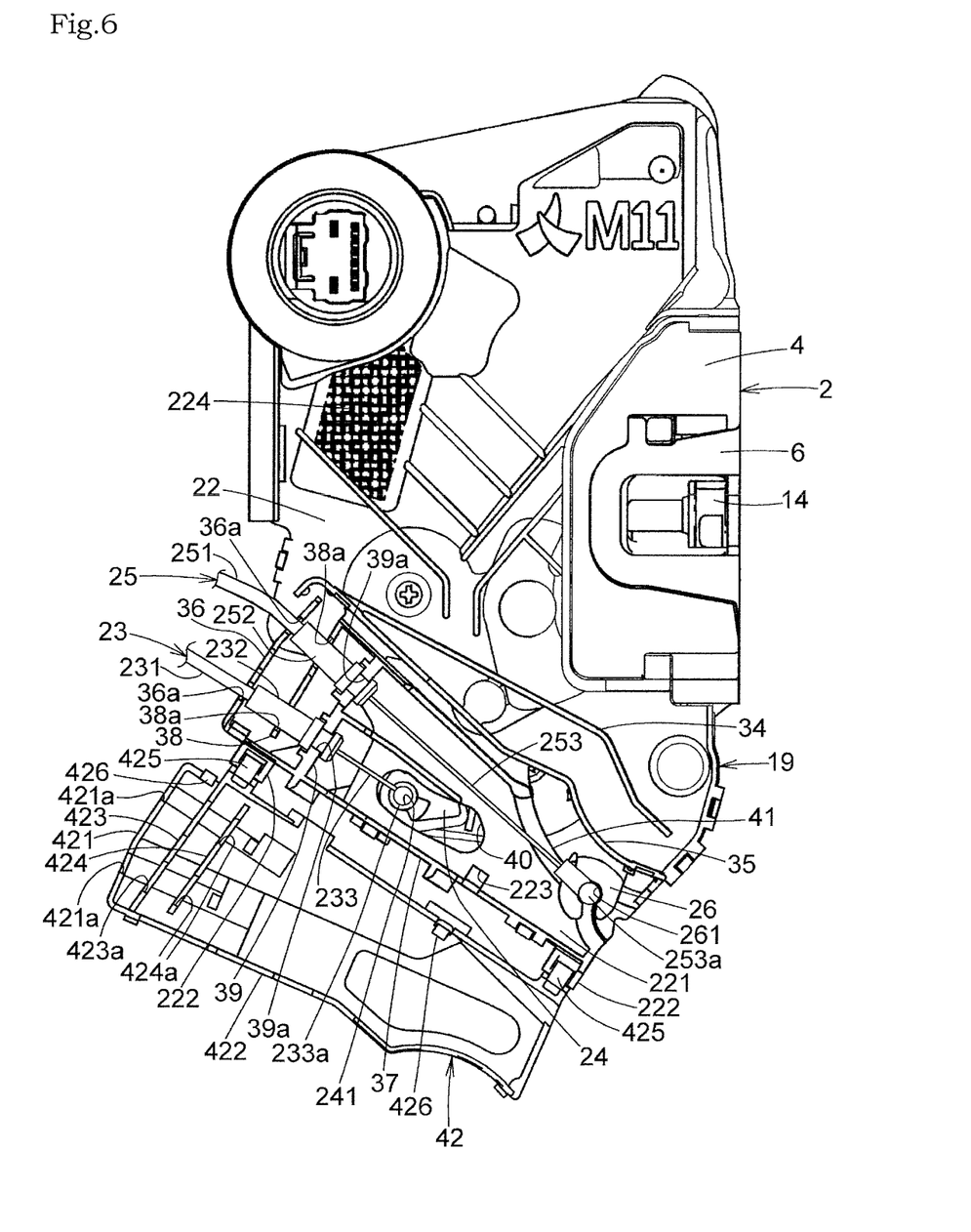
FIG. 6 is a side elevational view of the door latch device in which the auxiliary cover is attached and seen from an inside of a vehicle.

In FIGS. 5 and 6, there are formed an upper rainwater guide projection 34 and a lower rainwater guide projection 35 that project inward of the vehicle and tilt downward and backward at a lower side of the cover 22. The upper rainwater guide projection 34 and the lower rainwater guide projection 35 guide rainwater that flows down along a surface of the cover 22, downward thereby preventing it from flowing into a cable connection area 221 later described.

Under the lower rainwater guide projection 35 of the cover 22, there are formed the cable connection area 221 downward and backward for connecting the first Bowden cable 23 and the second Bowden cable 25 to the locking lever 24 and the inside lever 26 respectively. The cable connection area 221 is surrounded by the lower rainwater guide projection 35, a tilted front wall 36 that projects inward of the vehicle; and a lower wall 37 that projects inward of the vehicle along a lower edge of the cover 22.

The cable connection area 221 comprises a vertical intermediate wall 38 that projects inward of the vehicle opposite the front wall 36; a vertical cable holding portion 39 that projects inward of the vehicle slightly behind the intermediate wall 38; an elongate hole 40 that is open to communicate with the inside of the operation-mechanism holding portion 20 of the casing 19 along a rotation path of the lower end of the locking lever 40; and a notch 41 that communicates with the inside of the operation-mechanism holding portion 20 and is along a rotation path of a lower end of the inside lever 26 that projects into the cable connection area 221. In the front wall 36, there are formed two fitting grooves 36*a*, 36*a* in which ends of the outer tubes 231, 251 of the first and second Bowden cables 23, 25 fit, and in the intermediate wall 38, there are formed two fitting grooves 38*a*, 38*a* in which larger-diameter portions 232, 252 of the first and second Bowden cables 23, 25 fit. In the cable holding portion 39, there are formed holding grooves 39*a*, 39*a* in which circumferential grooves at the ends of the larger-diameter portions 232, 252 fit not to hold the larger-diameter portions 232, 252 not to move axially.

A connecting sphere 233*a* at the end of the inner cable 233 of the first Bowden cable 23 fits in a semi-spherical recess 241 at the lower end of the locking lever 24 through the elongate hole 40. An axial connection 253a at the end of the inner cable 253 of the second Bowden cable 25 fits in a fitting hole 261 at the lower end that projects from the notch 41 of the inside lever 26. The connecting sphere 233a and the axial connection 253a are prevented by an axially cover 42 closing the cable connection area 221 from getting out of the recess 241 and the fitting hole 261. The recess 241 of the locking lever 24 and the fitting hole 261 of the inside lever 26 correspond to connected portions.

The cable connection area 221 is closed by the synthetic-resin auxiliary cover 42 such as polypropylene separate from the cover 22 after the first and second Bowden cables 23, 25 are connected to the locking lever 24 and the inside lever 26 respectively.

In FIG. 5, the auxiliary cover 42 is approximately the same as the cable connection area 221 in shape, and when the cable connection area 221 is covered, a side wall 421 close to the front surface of the front wall 36 of the cover 22 projects toward the cable connection area 221. At the lower edge of the auxiliary cover 42, when the cable connection area 221 is closed, an upper wall 422 that can contact the side close to and under the lower rainwater guide projection 35 of the cover 22 is continuous with a side wall 421 and projects toward the cable connection area 221. When the cable connection area 221 is closed, there are formed holding grooves 421a, 421a that press from the inside of the vehicle and hold the outer tubes 231, 251 of the first and second Bowden cables 23, 25.

Furthermore, when the cable connection area 221 is closed, on a back side or a surface opposite the closed cable connection area 221, a first intermediate side wall part 423 positioned between the front wall 36 and the intermediate wall 38 of the cover 22 and a second intermediate side wall part 424 positioned between the front wall 36 and the cable holding portion 39 of the cover 22 project toward the cable connection area 221. On the first intermediate side wall portion 423 and the second intermediate side wall portion 424, there are formed upper and lower holding grooves 423a, 424a for holding the larger-diameter portions 232, 252 of the first and second Bowden cables 23, 25 when the cable connection area 221 is closed.

Figure 10:
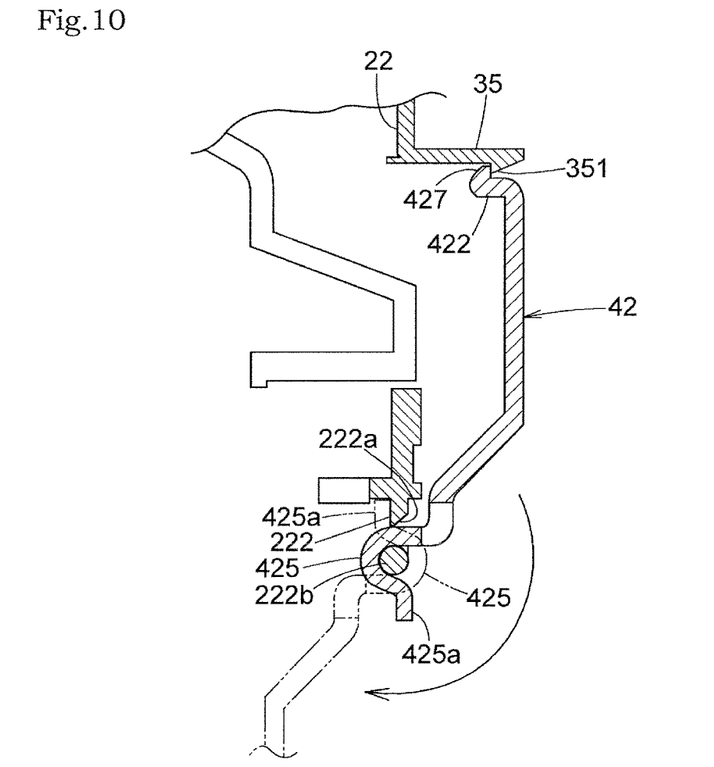
FIG. 10 is an enlarged sectional view taken along the line X-X in FIG. 7.
Figure 11:
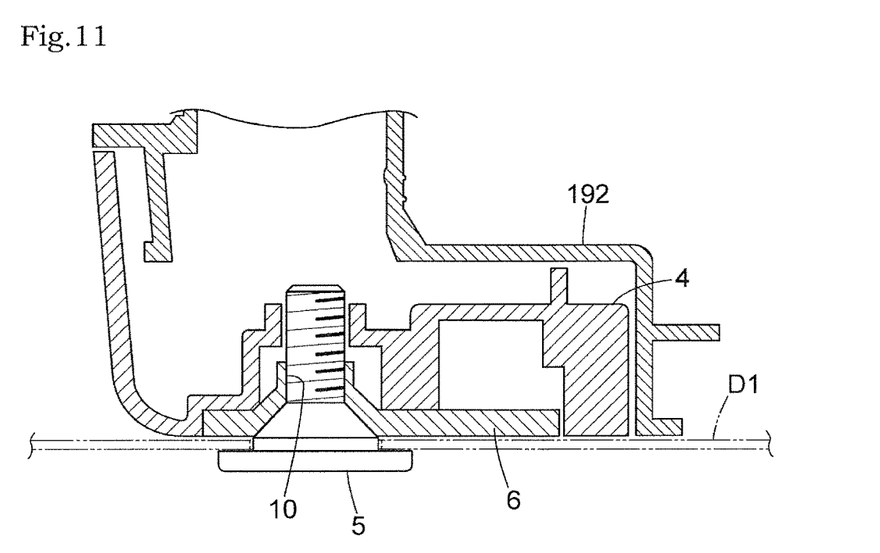
FIG. 11 is an enlarged sectional view taken along the line XI-XI in FIG. 1.

In a sectional view of FIG. 10, a pair of U-sectioned pivot portions 425, 425 is integrally formed at front and rear parts of the upper edge or a lower edge of the closed cable connection area 221, when the cable connection area 221 is closed. At a free end of each of the pivot portions 425, 425, there is provided a rotation preventing portion 425a for preventing the auxiliary cover 42 coupled to the cover 22 from rotating beyond an open position. The rotation preventing portion 425a is directed upward when the cable connection area 221 is closed, and is directed downward when the cable connection area 221 is open.

In FIG. 5, at front and rear parts of the lower edge of the cable connection area 221 of the cover 22, mounting portions 222, 222 project downward, and each of the mounting portions 222, 222 has an opening 222a into which the pivot portion 425 of the auxiliary cover 42 can pass, and a hinge shaft 222b that makes it possible for an inner surface of a U-shaped bent portion of the pivot portion 425 to pivot.

At a front end and a rear part close to an upper edge of the auxiliary cover 42, there are engagement portions 426, 426 each of which faces the outside of the vehicle when the cable connection area 221 is closed and has an engagement claw 426a.

Engagement claws 427, 427 project from a lower surface (upper surface when the cable connection area 221 is closed) of each of front and rear ends opposite the pivot portions 425, 425 of an upper wall 422 of the auxiliary cover 422 in FIG. 10.

When the cable connection area 221 is closed by the auxiliary cover 42, the engagement portions 426 fit in engagement holes 223, 223 at front and rear parts of a lower edge of the cable connection area 221 of the cover 22 to make the engagement claws 426a of the engagement portions 426 engage with a back edge thereof.

In FIG. 10, when the cable connection area 221 is closed by the auxiliary cover 42, both the engagement claws 427 are in contact with engagement claws 351 at front and rear parts of lower edge of the lower rainwater guide projection 35 of the cover 22. With the two engagement claws 426a and the engagement claws 427, the auxiliary cover 42 is stably fixed over the cable connection area 221 of the cover 22 without loosening.

Figure 7:
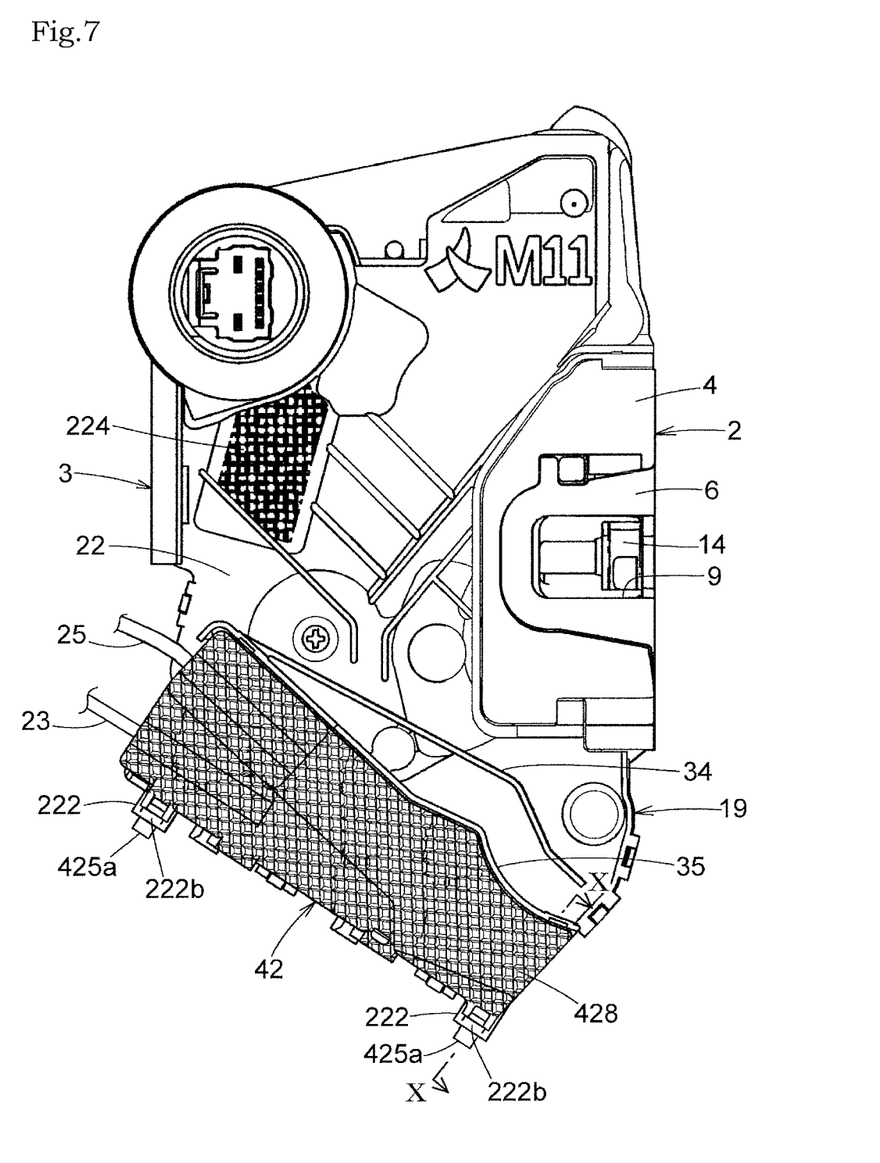
FIG. 7 is a side elevational view of the door latch device in which the auxiliary cover is closed and seen from the inside of the vehicle.

In FIG. 7, over a surface (inner side when the cable connection area is closed) of the auxiliary cover 42, there is formed a non-slip mesh-patterned ridge 428 is formed. By grasping a ridge 224 of the cover 22, the ridge 428 of the auxiliary cover 42 and a ridge 201 of the operation-mechanism holding portion 20 with hands, the door latch device 1 can be installed in the door D more efficiently.

In order to connect the auxiliary cover 42 to the cover 22, the rotation preventing portion 425a of each of the pivot portions 425 of the auxiliary cover 42 is inserted into the opening 222 of the cover 22 in a direction approximately perpendicular to an inner surface of the cover 22. The whole auxiliary cover 42 is turned downward, and the hinge shaft 222b of the mounting portion 222 is fitted in an inner circumferential surface of the pivot portion 425. In FIGS. 6 and 10, the auxiliary cover 42 is pivotally mounted vertically around the hinge shaft 222b between an open position in which the cable connection area 221 is open as shown by two dotted lines in FIG. 10 and a closed position in which the cable connection area 221 is closed as shown by solid lines in FIG. 10.

When the auxiliary cover 42 is in the open position, the rotation-preventing portion 425a at the end of the pivot portion 425 comes in contact with a surface that faces the outside of the vehicle, preventing the auxiliary cover 42 from turning in a direction toward the outside of the vehicle beyond the open position. Thus, the auxiliary cover 42 is held in the open position. Hence, the auxiliary cover 42 gets less likely to turn unexpectedly when the inner cables 233, 253 are connected to the locking lever 24 and the inside lever 26 respectively.

After the first Bowden cable 23 and the second Bowden cable 25 are coupled to the cable connection area 221 and the inner cables 233, 253 are coupled to the locking lever 24 and the inside lever 26, the auxiliary cover 42 is rotated to the closed position, the engagement portion 426 and the engagement claw 427 engage with the engagement hole 223 and the engagement projection 351 respectively, so that the auxiliary cover 42 is held in the closed position in FIGS. 7 and 10. Thus, the cable connection area 221 is covered with the auxiliary cover 42 thereby preventing rainwater from getting into the cable connection area 221. At four points of upper, lower, front and rear points, the auxiliary cover 42 is stably fixed in the cable connection area 221 of the cover 22 and is therefore prevented from loosening. When the cable connection area 221 is closed by the auxiliary cover 42, an upper part of the auxiliary cover 42 is covered with the upper rainwater guide projection 34 and the lower rainwater guide projection 35 for guiding backward and upward rainwater that flows down along the surface of the cover 22 thereby further making rainwater less likely to getting into the cable connection area 221.

The protection wall 33 is provided in the door latch device in the embodiment so as to prevent the theft means inserted in the door from getting into the operation-mechanism holding portion 20 of the first casing 191 through the opening 192 thereby improving antitheft performance of the door latch device 1. The protection wall 33 is integrally formed with the synthetic-resin body 4, thereby making the door latch device 1 smaller and lighter than a protection wall of the metal back member 17. The engagement portion 31 is integrally formed with the synthetic-resin body 4, not the metal back member 17, thereby making the door latch device 1 lighter in weight.

The foregoing relates to the embodiment of the present invention, but the following changes and modifications may be carried out to the embodiment without departing from the gist of the present invention.

In the foregoing embodiment, the protection wall 33 that covers the opening 192a from a direction facing the outside of the vehicle is integrally formed with the lower surface of the body 4. For example, as shown by the two-dotted lines in FIGS. 3 and 9, the protection wall 33 may integrally be formed upward with the side of the first casing 191 that faces the outside of the vehicle along a rear surface of the outside lever 29, making the upper end close to the lower surface of the body along a rear surface of the outside lever 29. The protection wall 33 can be provided in the second casing 192. For example, the protection wall 33 may project upward along the rear surface of the outside lever 29 from a rear surface of the lower end of the base portion 193 of the second casing 192.

The present invention may be applied to a door latch device in which the outside lever 29 is covered with the second casing 192 except the outer end, part of the second casing 192 around a pivot portion of the outside lever 29 that faces the inner panel D1 of the door D is partially open thereby fixing a picot shaft of the outside lever 29 to the back member 17 through the opening by caulking. A theft means is prevented from getting in the caulking opening of the second casing 192 by the protection wall 33 of the door latch device as above.

What is claimed is:

1. A vehicle door latch device for a door comprising:
a synthetic-resin body with an engagement mechanism that engages with a striker to hold the door closed;
a synthetic-resin casing mounted to the body and including a locking lever and an opening lever that are respectively switchable to either an unlock state and a lock state;
a cover for closing the casing, a space being provided between the cover and the casing to house the locking lever and the opening lever; and
an outside lever pivotally mounted to the casing under the body to extend in a vehicle interior/exterior direction such that a middle portion of the outside lever is supported by a support shaft;
wherein a first end of the outside lever, inside a vehicle, is connected to the opening lever through an opening formed in the casing under the body and communicating with the space housing the locking lever and the opening lever so that the first end of the outside lever is inserted into the casing, and a second end of the outside lever, outside the vehicle, is connected to an outside handle on the door; and
a projecting protection wall is vertically provided on the body, and is positioned behind the outside lever, and between a connection part between the outside lever and the opening lever and the support shaft of the outside lever, for preventing a theft component from getting into the space housing the locking lever and the opening lever, through the opening, by projecting from the body in a direction intersecting a direction in which the theft component gets into the opening and by covering the connection part from a direction outside the vehicle, thereby preventing the locking lever and the opening lever from being moved, by the theft component, to the unlock state.

2. The vehicle door latch device for a door according to claim 1, wherein the projecting protection wall is vertically projected downward from a lower surface of the body so as to be positioned behind the outside lever, and between the connection part and the support shaft of the outside lever.

3. The vehicle door latch device for a door according to claim 1, wherein the opening is vertically open toward the direction outside the vehicle, and the projecting protection wall is vertically projected so as to be extended in a longitudinal direction of the vehicle and to face the opening.

4. The vehicle door latch device for a door according to claim 1, the opening is positioned behind the outside lever, and between the connection part and the projecting protection wall such that the projection protection wall faces the opening.

\* \* \* \* \*